United States Patent
Seaman et al.

(10) Patent No.: US 6,999,112 B2
(45) Date of Patent: Feb. 14, 2006

(54) SYSTEM AND METHOD FOR COMMUNICATING CONTENT INFORMATION TO AN IMAGE CAPTURE DEVICE

(75) Inventors: Mark D. Seaman, Greeley, CO (US); Gregory A. Brake, Fort Collins, CO (US); Robert D. Thompson, Loveland, CO (US); K Douglas Gennetten, Ft Collins, CO (US); Jerlyn R Culp, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 09/999,756

(22) Filed: Oct. 31, 2001

(65) Prior Publication Data

US 2003/0081126 A1    May 1, 2003

(51) Int. Cl.
   *H04N 5/225* (2006.01)

(52) U.S. Cl. .............................. 348/207.1; 348/211.2; 348/333.02

(58) Field of Classification Search ............. 348/207.1, 348/552, 348, 207.99, 211.1–3, 211.99, 239, 348/333.02; 396/52, 57, 310, 2, 72; 455/522; 379/56.1
   See application file for complete search history.

(56) References Cited

U.S. PATENT DOCUMENTS

| | | | |
|---|---|---|---|
| 4,183,056 A | 1/1980 | Evans et al. | |
| 5,296,884 A | 3/1994 | Honda et al. | 354/106 |
| 5,634,144 A * | 5/1997 | Mauro et al. | 396/57 |
| 5,768,633 A * | 6/1998 | Allen et al. | 396/2 |
| 6,337,951 B1 * | 1/2002 | Nakamura | 396/57 |
| 6,363,139 B1 * | 3/2002 | Zurek et al. | 379/56.1 |
| 6,396,537 B1 * | 5/2002 | Squilla et al. | 348/239 |
| 6,823,195 B1 * | 11/2004 | Boesen | 455/522 |
| 2002/0041329 A1 * | 4/2002 | Steinberg | 348/207 |
| 2002/0076217 A1 * | 6/2002 | Rodriguez et al. | 396/72 |

FOREIGN PATENT DOCUMENTS

| | | |
|---|---|---|
| WO | WO 99/63686 | 12/1999 |
| WO | WO 01/20489 | 3/2001 |

* cited by examiner

*Primary Examiner*—David L. Ometz
*Assistant Examiner*—Brian Jelinek

(57) ABSTRACT

A content information manager communicates content information to a digital image capture device. One embodiment comprises a means for storing the content information in a memory, a means for communicating the content information to a digital image capture device, and a means for receiving a request such that the content information is communicated to the digital image capture device when the request is received. Another embodiment comprises a means for communicating a request signal such that the content information manager provides the content information upon receiving the request signal, a means for receiving the content information from the content information manager, and a means for displaying the content information on a display residing on the digital image capture device.

25 Claims, 6 Drawing Sheets

SYSTEM AND METHOD FOR COMMUNICATING CONTENT INFORMATION TO AN IMAGE CAPTURE DEVICE

BACKGROUND OF THE INVENTION

1. Field of the Invention

The present invention generally relates to digital image capture devices and, in particular, to a system and method for communicating content information to an image capture device.

2. Related Art

With the advent of digitally-based image capture devices capable of "photographing" an image and providing the image in a digital data format, a digital "photograph" of the image is stored in a memory residing within or coupled to the image capture device. A nonlimiting example of a digital image capture device is the digital camera that captures still images and/or video images.

The operator of the image capture device typically would, at a later time, process the image on their PC using a commercially available digital image processing program. The operator would download the images recorded and stored in the digital camera memory into the PC memory, or print the images on a suitable printing device. Also, the operator may optionally perform various image processing functions, such as, but not limited to, resizing the image, adding borders to the image, cropping out portions of the image, adding meta-data to the image, etc. After the digital images have been downloaded to the PC memory, and processed if desired, one or more images may be transmitted to others via e-mail or uploaded onto another media, such as a floppy disk.

However, capturing the digital still and/or video images with conventional image capture devices is limited to capturing images sensed by the photosensor elements residing in the digital image capture device.

SUMMARY OF THE INVENTION

Generally, one embodiment of the present invention comprises a means for storing the content information in a memory, a means for communicating the content information to the digital image capture device and a means for receiving a request such that the content information is communicated to the digital image capture device when the request is received. Another embodiment according to the present invention receives a proximity signal from a digital image capture device that indicates the proximity of the digital image capture device to the content information manager and transfers the content information to the digital image capture device. Another embodiment according to the present invention comprises a means for communicating a request signal such that the content information manager provides the content information upon receiving the request signal, a means for receiving the content information from the content information manager and a means for displaying the content information on a display residing on the digital image capture device.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

In general, the present invention relates to a system and method for providing additional content information to one or more digital imaging capturing devices, such as a digital camera that captures still and/or video images. Hereinafter, the term image refers to digital still and/or video information. In one embodiment, the content information includes image information and/or textual information.

Figure 1:
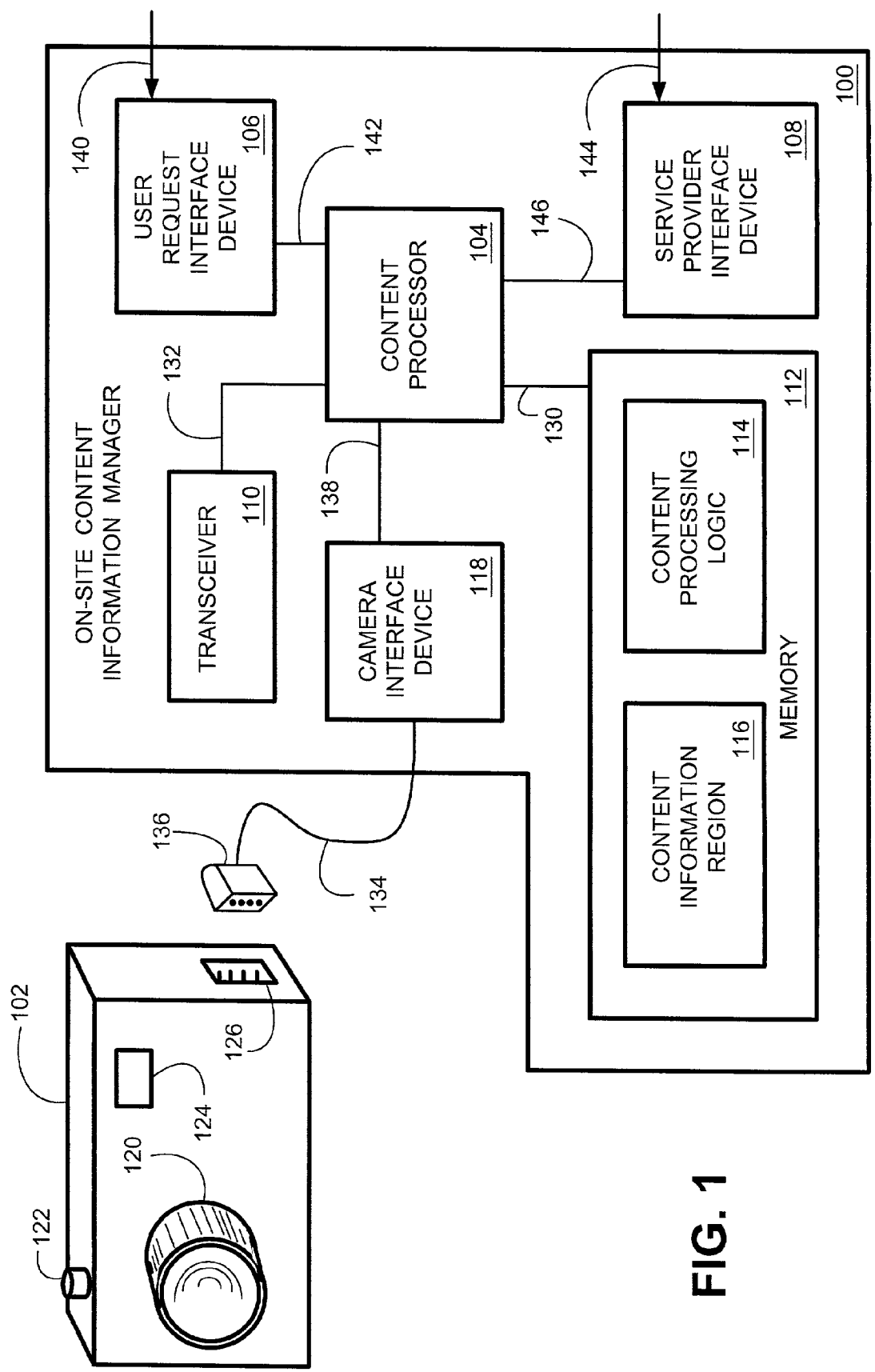
FIG. 1 is a block diagram illustrating an embodiment of an on-site content information manager according to the present invention in communication with a digital image capture device.

FIG. 1 is a block diagram illustrating an embodiment of an on-site content information manager in communication with a digital image capture device 102. The on-site content information manager 100 includes at least a content processor 104, a user request interface device 106, a service provider interface device 108, a transceiver 110 and a memory 112. Memory 112 includes portions of the memory structure dedicated for storing data corresponding to the content information residing in the content information region 116 and content processing logic 114. One embodiment of the on-site content information manager 100 includes an optional camera interface device 118 configured to provide a hard wire connection, as described below, to the digital image capture device 102.

For convenience of illustrating an image capture device in FIG. 1, the digital camera 102, is illustrated as resembling a generic version of a digital camera used to capture digital still images and will be referred to as digital camera 102 to simplify the discussion. However, digital camera 102, according to the present invention includes additional internal components for receiving the content information from the on-site content information manager 100. The digital camera 102 commonly includes at least a lens unit 120, an image capture actuation button 122, a viewing lens 124 and a plug-in interface unit 126. Lens unit 120 is used for the focusing of the image prior to the "photographing" of the image. When the operator (not shown) has focused the image to be captured and is satisfied with the nature of the image that will be captured by digital camera 102, the operator actuates the image capture actuation button 122 to cause the digital camera 102 to record a digital image, thus "photographing" (capturing, recording) the image.

Digital camera 102, or other digitally-based image capture devices, also includes additional components not shown in FIG. 1. Such components are not discussed herein as such components are not necessarily related to the operation of a digital camera 102 when employed with the on-site content information manager 100. Furthermore, for convenience of illustration, digital camera 102 is illustrated from a perspective that shows only the front, top and one side view of digital camera 102. Digital camera 102 has additional components residing on the hidden sides of the digital camera 102 not illustrated or discussed herein as such components are not necessarily related to the operation of a digital camera 102 when employed with an on-site content information manager of the present system. However, such components will be described below should such components (not shown) become relevant to the discussion of the operation of a digital camera 102 with respect to an on-site content information manager of the present invention.

Furthermore, for convenience of illustration and explanation of the operation and functionality of an on-site content information manager consistent with the teachings of the present invention, the appearance of the digital camera 102 indicates that the digital camera 102 is particularly suited for the capturing of digital still images. However, such a digital camera 102 is easily adapted to capture digital video images. Furthermore, it is intended that an on-site content information manager 100 according to the present invention perform with other types of digital image capture devices (not shown) such as, but not limited to, a digital video camera or a digital motion picture camera, and is intended to be within the scope of this disclosure.

Figure 2:
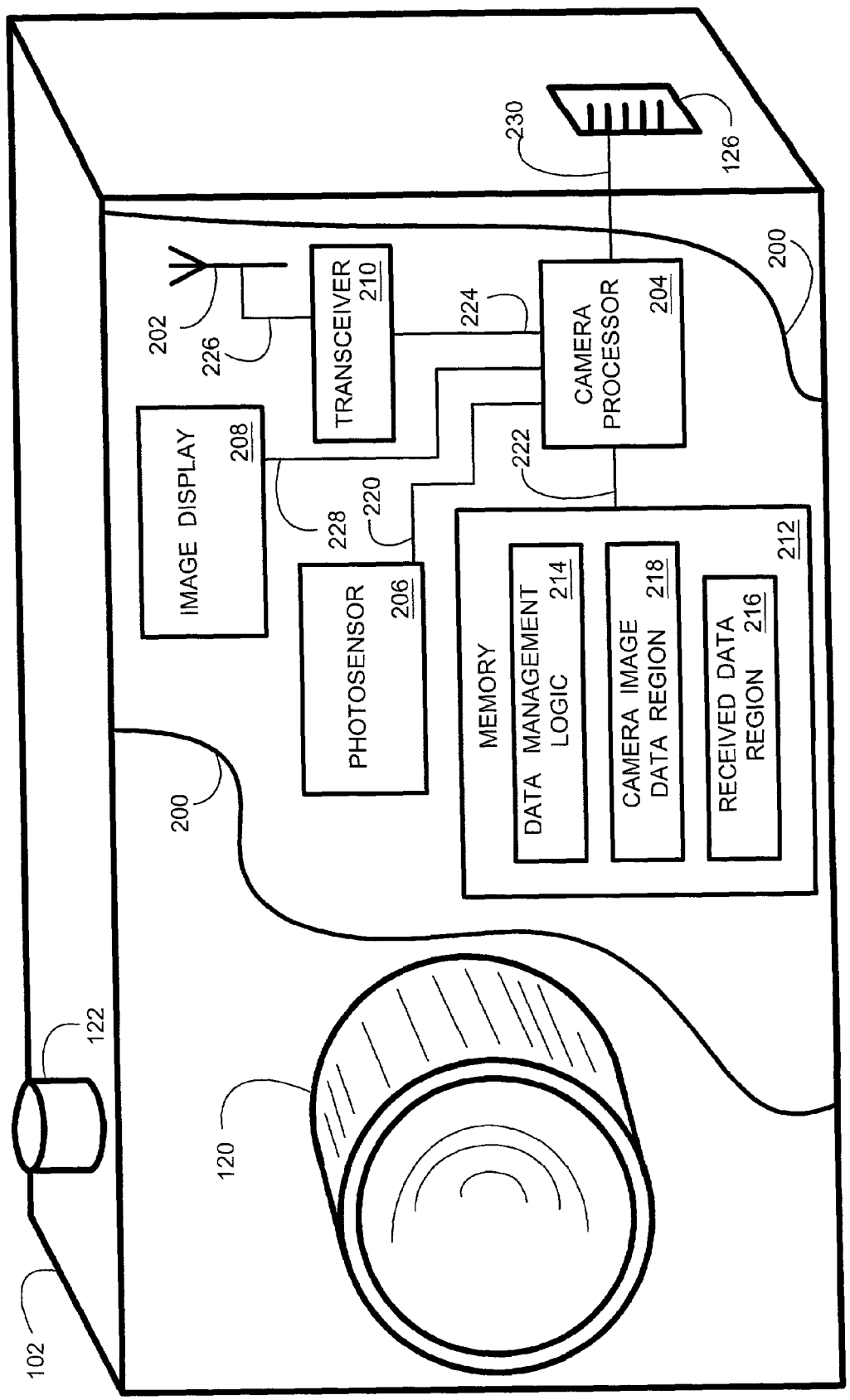
FIG. 2 is a block diagram illustrating selected internal components of a digital image capture device configured to communicate with an on-site content information manager according to the present invention.

FIG. 2 is a block diagram illustrating selected internal components residing within the digital camera 102 that are configured to communicate with the on-site content information manager 100 (FIG. 1). Cut-away line 200 demarks components residing on the outside surfaces of digital camera 102 and components residing internally in digital camera 102. Thus, lens unit 120, image capture actuation button 122, viewing lens 150 and plug-in interface unit 126 are recognized as components residing on the surface of digital camera 102.

The internal components of digital camera 102 are illustrated between the two cut-away lines 200. Internal components of digital camera 102 comprise an antenna 202, a camera processor 204, a photosensor 206, an image display 208, a transceiver 210 and memory 212. Memory 212 further includes regions allocated for the data management logic 214, the received data region 216 and camera image data region 218. Image display 208 is configured to provide a viewing screen disposed on the outside surface of digital camera 102 at a convenient location for viewing by the user of digital camera 102. Such an image display 208 may have its viewing surface (not shown) located on the back side or on the top of digital camera 102. Photosensor 206 is disposed in a suitable position behind lens unit 120 such that an image (not shown) may be focused onto photosensor 206 for capturing.

Like a conventional digital camera or digital image capture device, digital camera 102 records the digital image to be captured on photosensor 210. The user views the image to be captured by looking through the viewing lens 124 (FIG. 1). When the user actuates the image capture actuation button 122, the image detected by photosensor 206 is received by processor 204, via connection 220, and stored in memory 212 in the image data region 218, via connection 222. Photosensor 206, processor 204 and memory 212 are conventional components employed in the art of capturing digital images. Furthermore, one skilled in the art will realize that a digital camera or other digital image capture device 102 may have the components shown in FIG. 2 connected in a different order and manner than shown, or may not include all of the components shown, or may include additional components connected in some other manner with the components shown without adversely affecting the operation and functionality of the digital camera 102 when operated as part of an on-site content information manager 100 according to the present invention. Any digital camera or a similarly configured digital image capture device is intended to be within the scope of this disclosure.

Operation and functionality of the on-site content information manager 100 is now described with reference to FIGS. 1 and 2. In one embodiment, the on-site content information manager 100 is a portable stand-alone device that is located in proximity to the digital camera 102. The operator of digital camera 102 initiates a request to on-site content information manager 100 to have content information added into memory 212 residing in the digital camera 102, in a manner described below. Content processor 104 then executes the content processing logic 114 to access the content residing in the content information region 116, via connection 130.

Content processor 104 then initiates the transfer of the content information to the digital camera 102. In one embodiment, transceiver 110 receives the content information from the content processor 104, via connection 132, and broadcasts the content information to the digital camera 102. Transceiver 110 broadcasts the content information using a conventional wireless communication signal.

Camera processor 204 is configured to receive wireless communication signals from transceiver 210, via connection 224, as described below. Antenna 202 residing in the digital camera 102 detects the broadcasted content information, and provides a suitable signal to transceiver 210, via connection 226. Transceiver 210 further processes the received signal containing the content information into a format suitable for the camera processor 204. Camera processor 204 then stores the received content information in the received data region 216 of memory 212. In one embodiment of digital camera 102, camera processor 204 provides a signal to image display 208, via connection 228, such that a first portion of the received content information is displayed on image display 208. Thus, the operator of digital camera 102 understands that content information has been received from the on-site content information manager 100. In another embodiment, the operator of digital camera 102 requests camera processor 204 to display portions of the content information stored in the received data region 216.

In an alternative embodiment, content information is provided to digital camera 102 via a conventional hard wire connection 134. Connection 134 is coupled to the plug-in attachment 136. Thus, the operator couples the digital camera 102 to the on-site content information manager 100 by coupling the plug-in attachment 136 to the plug-in interface 126. A plug-in attachment 136 is configured to mate with the plug-in interface unit 126. Content processor 104 accesses the content information residing in the content information region 116 and provides the content information to the camera interface device 118. Camera interface device 118 formats the content information into a suitable signal that is received by the camera processor 204. Camera processor 204 receives the content information from the camera interface device 118 via connection 230. Such an embodiment is particularly advantageous in applications where conventional digital cameras and/or digital cameras 102 not equipped with antenna 202 and transceiver 210 receive downloaded content information from an on-site content information manager 100.

Figure 3:
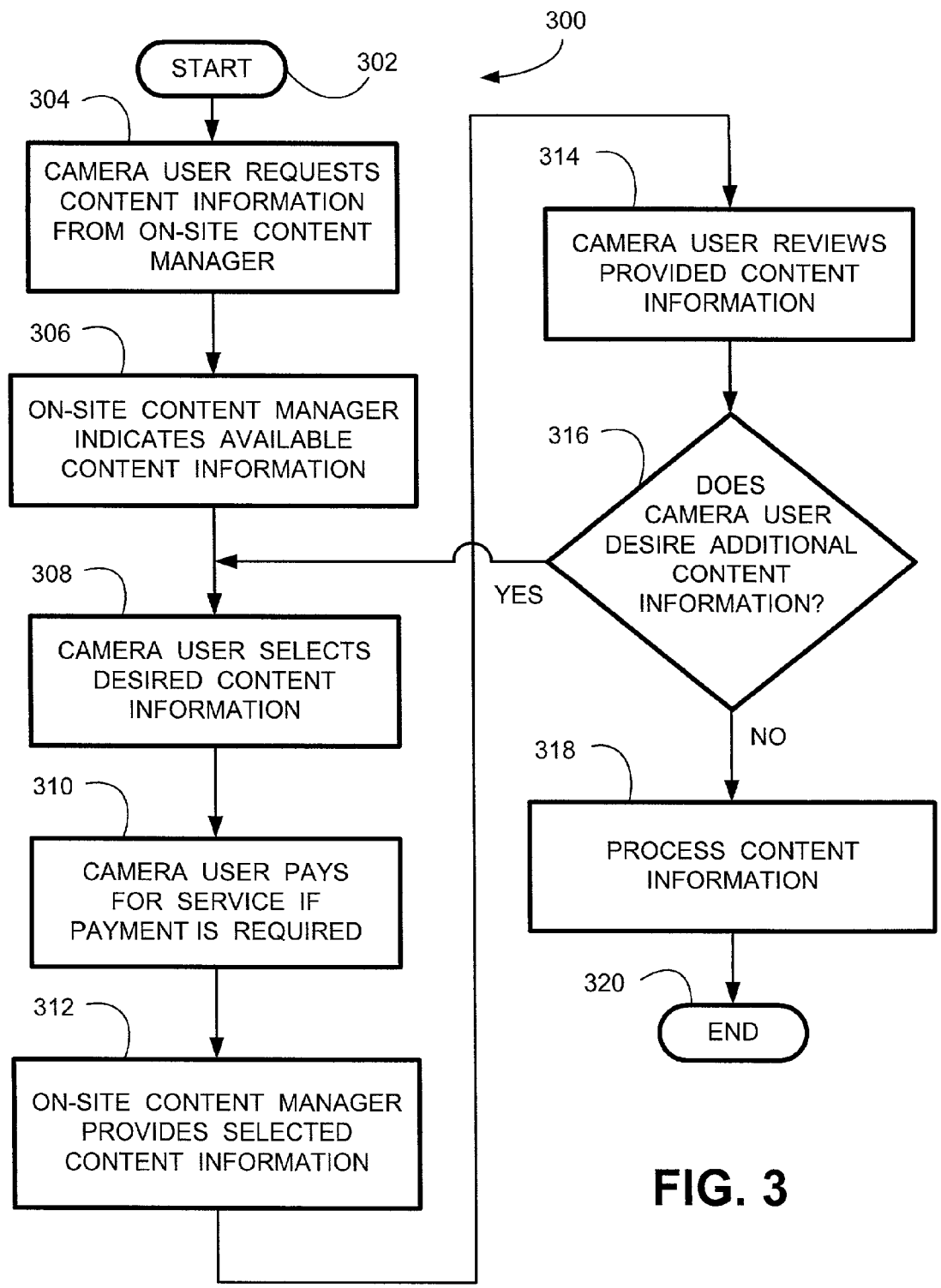
FIG. 3 is a flow chart illustrating a process, according to the present invention, for providing content information to a digital image capture device.

FIG. 3 is a flow chart 300, according to the present invention, illustrating an embodiment of a process providing content information to the digital camera 102. The flow chart 300 of FIG. 3 also shows the architecture, functionality, and operation of a possible embodiment of software for implementing the content processing logic 114 (FIG. 1). In this regard, each block may represent a module, segment or portion of code, which comprises one or more executable instructions for implementing the specified logical function(s). It should also be noted that in some alternative implementations, the functions noted in the blocks may occur out of the order noted in FIG. 3 or may include additional functions without departing from the functionality of the on-site content information manager 100. For example, two blocks shown in succession in FIG. 3 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 302. At block 304, the user of digital camera 102 requests content information from the on-site content information manager 100. At block 306, the on-site content information manager 100 indicates available content information to the user of digital camera 102. At block 308, the user of digital camera 102 selects the desired content information. Optionally, at block 310, the user of digital camera 102 pays for any services provided by the on-site content information manager (such as providing content information). At block 312, the on-site content information manager provides the selected content information to digital camera 102 in a manner described herein. At block 314, the user of digital camera 102 reviews the provided content information. At block 316, the user determines whether or not additional content information is desired. If so (the YES condition), the process returns to block 308.

If the user of digital camera 102 does not desire additional content information (the NO condition), the process proceeds to block 318 wherein the user of digital camera 102 further processes the provided content information. For example, but not limited to, the user may review all, or selected parts, of the received content information. If the user does not want to review the received content information, the user may decide to delete the received content information, thereby increasing the available capacity of memory 212. In one embodiment, the user may simply take no action such that the camera process the content information by deleting the content information. For example, but not limited thereto, the content information may be deleted after a predefined time delay, after the user has moved the digital camera 102 a predefined distance from the source of the content information, or upon receipt of a signal from the source of the content information indicating that the content information is to be deleted. In another embodiment, the content information is saved if the user does not review the content information.

In one embodiment, the user may cause the content information to be associated with one or more images. A system and method of associating meta-data, such as, but not limited to content information, with image data captured by an image capture device is described in the commonly-assigned and co-pending application entitled "SYSTEMS AND METHODS FOR GENERATING DIGITAL IMAGES HAVING IMAGE META-DATA COMBINED WITH THE IMAGE DATA," filed on Oct. 31, 2001, having application Ser. No. 10/002,706, and which is incorporated entirely herein by reference. The process ends at block 320.

One skilled in the art will appreciate that the simplified illustrative flow chart 300 of FIG. 3 describes only one of the many above-described processes whereby content information is provided to a digital camera 102. Because of the numerous variations described herein, specific flow charts are not provided for each of the various alternative embodiments and methods described herein for convenience. One skilled in the art will readily appreciate the minor variations and/or alterations to flow chart 300 of FIG. 3 useful to implement any one of the above-described embodiments.

In one embodiment, the content information provided by the on-site content information manager 100 to the digital camera 102 includes image information (still and/or video), meta-data and/or audio information. Image information may include video-cam scenes, professionally photographed images, maps, background scenes or the like. Meta-data may include segments of textual information. Meta-data may also include other related information that the operator of the digital camera 102 is interested in, such as, but not limited to, location, time date, global positioning system (GPS) coordinates, explanations, history, items for sale, copyright information, weather reports, schedules. Audio information may include segments of pre-recorded music, recorded lectures on a topic of interest, or the like. One embodiment allows the user to customize content information, such as by providing annotations or the like regarding the content information.

One non-limiting example of content information provided to digital camera 102 includes image data corresponding to the location of the on-site content information manager 100. For example, image data provided by the on-site content information manager 100, if located in a museum, includes images corresponding to museum exhibits. Furthermore, meta-data might include additional textual information describing the exhibits shown by the provided image. Thus, the operator of digital camera 102 would approach an exhibit and view on image display 208 (FIG. 2) the provided content information relating to the exhibit (images, audio information and/or meta-data). Such an embodiment of the on-site content information manager 100 is particularly suited for an implementation that employs a continuous broadcasting of the content information or employs a proximity sensing apparatus that detects the approach of the digital camera 102.

Another illustrative example of the application of the on-site content information manager 100 is an embodiment of the on-site content information manager 100 that provides content information related to a locale that the operator is traveling to or is currently at. Such an embodiment of the on-site content information manager 100 is preferably located at a convenient locale, such as, but not limited to, a library, an airport or an entrance point to the site that the operator is visiting. For example, the operator may be visiting Old Faithful Geyser in Yellowstone National Park. The operator could go to a library where an on-site content information manager 100 is located and download content information related to the Old Faithful Geyser. Or, when in-route to visit the Old Faithful Geyser, the operator could access content information at an on-site content information manager 100 located in a convenient location, such as an airport or hotel. Yet another on-site content information manager 100 located nearby the Old Faithful Geyser could provide the operator of digital camera 102 content information related to the Old Faithful Geyser.

Meta-data information could include information of interest to the operator visiting Old Faithful Geyser, such as the frequency of geyser eruptions, height of the geyser eruptions, or the date that Old Faithful Geyser was discovered by the early frontiersmen. Furthermore, image information may include video images of eruptions so that the operator viewing the content information provided by the on-site content information manager 100 could view a video image of Old Faithful Geyser erupting without actually having to stay until the Old Faithful Geyser erupts. Thus, the operator of digital camera 102 is informed about Old Faithful Geyser by viewing the received content information on image display 208 (FIG. 2).

One skilled in the art will appreciate that the possible applications of an on-site content information manager 100 configured to provide content information (images, audio information and/or meta-data) to a digital camera 102 are endless. Thus, the two above-described applications of an on-site content information manager 100 are intended to be merely illustrative examples of the many possible applications of the on-site content information manager 100. Any such variations in an on-site content information manager 100 customized for a particular application wherein content information is provided to a digital camera 102 is intended to be within the scope of the present invention.

Figure 6:
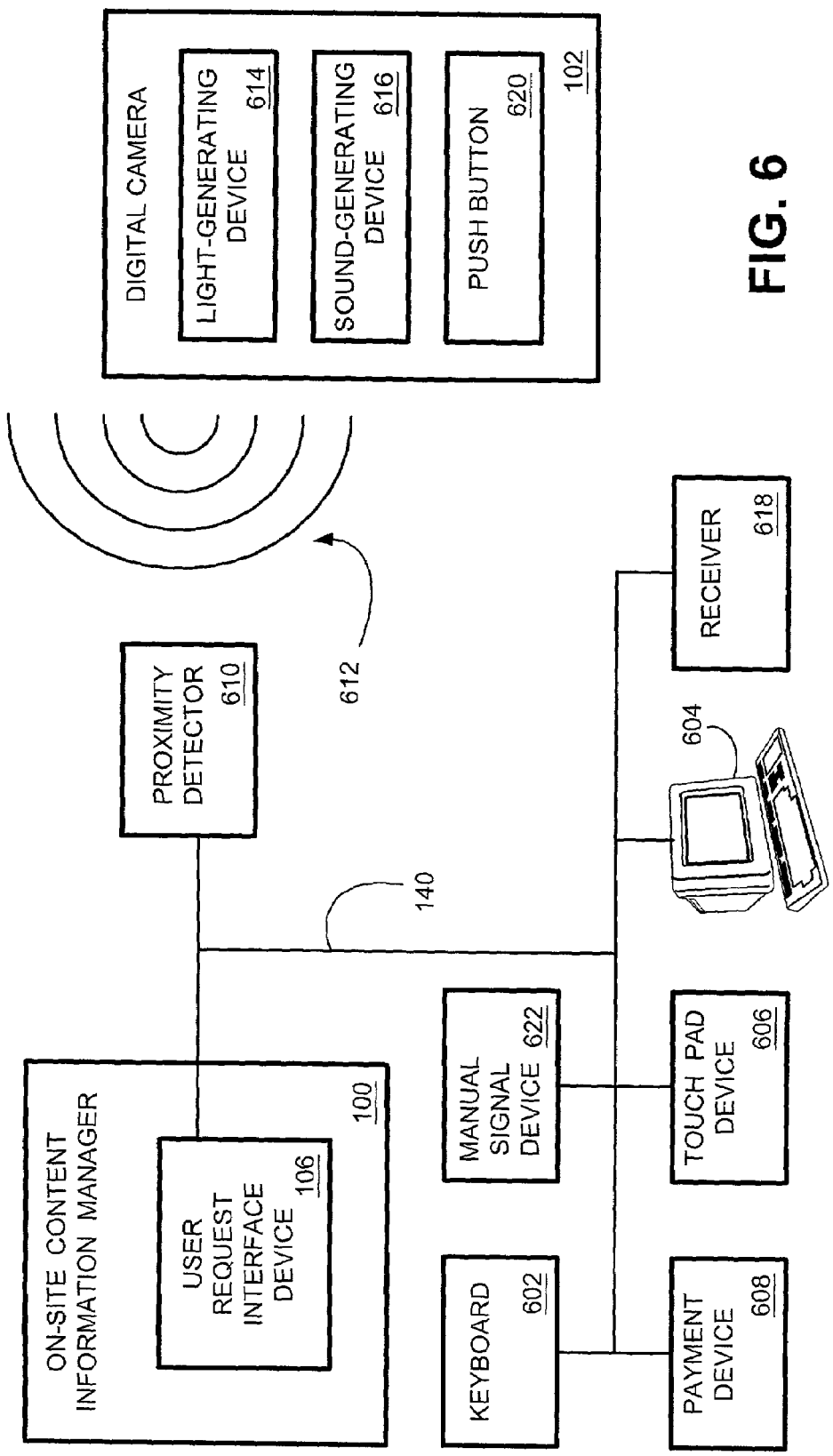
FIG. 6 is a block diagram illustrating various devices for generating and receiving a request to provide content information to a digital camera according to the teachings of the present invention.

As described herein, the operator of digital camera 102 preferably initiates the transfer of content information into digital camera 102 by the on-site content information manager 100. User request interface device 106 is configured to receive a request from the user, via connection 140, that indicates that the operator is requesting the on-site content information manager 100 to provide content information into digital camera 102. In one embodiment, user request interface device 106 is configured to receive a signal provided by a conventional input device (not shown) or from a specially fabricated input device 602 (FIG. 6). For example, but not limited to, user request interface device 106 may be configured to receive information from a conventional keyboard device (not shown) coupled to connection 140. Thus, the operator requesting transference of content information to the digital camera 102 specifies information of interest that is to be downloaded into the digital camera 102. Furthermore, security features may be implemented in the content processing logic 114 executed by content processor 104 such that the operator requesting content information is required to provide a pre-authorized password or the like.

In another embodiment, connection 140 is coupled to a device 604 (FIG. 6) having a viewing screen and a means for the operator requesting the content information to communicate with the content processor 104. For example, a conventional display screen and a conventional keyboard may be coupled to connection 140. Upon accessing the on-site content information manager 100, the content processor 104 provides to the operator a listing of available content information, examples of available content information, and/or a display of specific content information requested by the operator. Alternatively, a conventional touch pad device 606 (FIG. 6), a viewing screen sensitive to finger touching, or the like, is coupled to connection 140. Such a feature is particularly advantageous when the amount of information provided by the on-site content information manager is too large to be downloaded in its entirety into the received data region 216 (FIG. 2), or when the operator requesting the content information is interested in interactively specifying the content information that is to be provided by the on-site content information manager 100.

In yet another embodiment, the device coupled to connection 140 includes a means to accept a conventional form of monetary payment (not shown) from the operator requesting the content information. That is, the on-site content information manager 100 is configured to operate with a payment device 608 (FIG. 6) such that a for-pay service is provided. For example, but not limited to, the payment device 608 is configured to accept currency or electronic payment by a credit card, debit card, pre-paid card or the like. Such an embodiment is particularly advantageous when it is desirable to generate revenues with an on-site content information manager 100.

Yet another embodiment of the on-site content information manager 100 is configured to be coupled to a proximity detector 610 via connection 140. The proximity detector detects the proximity of digital camera 102 based upon a proximity signal 612 provided by digital camera 102 (such as an audio signal, RF signal, optical signal, infrared signal or other suitable signal). When the digital camera comes within a predefined distance associated with the reception of the proximity signal 612, the on-site content information manager 100 initiates a broadcast of the content information from the on-site content information manager 100 to the digital camera 102. Such an embodiment is particularly advantageous when the operator of digital camera 102 is traveling to a plurality of locations, each location having an on-site content information manager 100 located in close proximity to the visited location.

In accordance with the above-described embodiment of a content information manager 100 configured to provide content information when the digital camera 102 is in proximity to the content information manager 100, the digital camera 102 is configured to generate a proximity signal 612. FIG. 6 is a block diagram illustrating various devices for generating and receiving a request to provide content information to a digital camera 102 according to the teachings of the present invention. Such a proximity signal 612 includes, but is not limited to, a radio frequency (RF) signal, an optical signal, an infrared signal and/or an audio signal. Accordingly, the camera 102 includes at least one device to generate the proximity signal 612. For example, camera 102, in one embodiment, includes a light-generating device (614) that generates an optical proximity signal or an infrared proximity signal that is detected by the content information manager 100. Camera 102 may use an existing flash device to generate the optical proximity signal or a dedicated light generator. In another embodiment, camera 102 includes a sound-generating device (161) that generates a sound proximity signal that is detected by the content information manager 100. Such a sound proximity signal may be an audible frequency or an inaudible frequency sound. In yet another embodiment, camera 102 is configured to cause the transceiver 210 (FIG. 2) to generate an RF proximity signal that is detected by a receiver 618 or by the transceiver 110 (FIG. 1) in the content information manager 100.

Another embodiment of the on-site content information manager 100 is configured to continually broadcast content information such that when the digital camera 102 comes within the range of the broadcasted content information signal, the digital camera 102 automatically receives and stores the broadcasted content information. This embodiment may include an optional means to accept the broadcasted content information on the digital camera 102. For example, a simple push button (620) residing in the digital camera 102 may be provided to initiate acceptance of the broadcasted content information into the digital camera 102. Thus, such an alternative embodiment of the on-site content 102 could initiate signal to which 100 responds with broadcast information manager omits connection 140 and the user request interface device 106. Such alternative embodiments are particularly advantageous when the operator of digital camera 102 is traveling to a plurality of locations, each location having an on-site content information manager 100 located in close proximity to the visited location, and where it is desirable to provide ease of operation.

Another embodiment of the on-site content information manager 100 is configured to respond to a simple signal on connection 140 that corresponds to a manual request by the operator of digital camera 122. For example, the operator actuates a button, rocker switch, or other manual signal device 622 that generates a proximity signal onto connection 140. Such an embodiment is particularly advantageous in applications where simplicity and ease of use is desirable.

Another embodiment of the on-site content information manager 100 integrates the user request interface device 106 and the camera interface device 118 into a single unitary interface device. Thus, when the operator of digital camera 102 plugs in the digital camera 102 to the on-site content information manager 100, via connection 134, the on-site content information manager 100 recognizes the plug-in of the digital camera 102. One embodiment automatically initiates a transfer of the content information. Another embodiment transfers the content information upon receiving a proximity signal from the push button 620 or another signal generating device residing in the digital camera 102. Such a feature is particularly advantageous in applications where simplicity and ease of use is desirable. Also, such a feature is particularly advantageous in applications where digital camera 102 may not necessarily include transceiver 210 and antenna 202 configured to detect a broadcasted content information signal.

One skilled in the art will appreciate that the above-described processes whereby a user of the digital camera 102 receives downloaded content information describe only a limited number of exemplary processes for receiving the content information. Other processes may be implemented on an on-site content information manager 100 such that the content information is downloaded into a digital camera 102 without departing from the operation and functionality of the present invention. Furthermore, any combination of more than one of the above-described processes may be concurrently or even interactively implemented within an on-site content information manager 100 to provide a greater degree of flexibility in providing the content information to a digital camera 102. Such combinations of processes are particularly advantageous when content information is to be downloaded to a plurality of different types of digital cameras 102 that are differently configured to receive content information.

The on-site content information manager 100 includes the service provider interface device 108 configured to receive input content information (images, audio information and/or meta-data) from the administrator or service provider of the on-site content information manager 100. The administrator couples a suitable input device (not shown) to connection 144. The input content information is received by the service provider interface 108 on connection 144, and then provided to the content processor 104 via connection 146. The content processor 104 executes the content processing logic 114 to appropriately configure the received content information for storage into the content information region 116. For example, but not limited to, images residing in the content information region 116 may be updated, discarded, or replaced. Or, new images may be added to supplement existing images. Likewise, meta-data and/or audio information may be added, deleted or modified.

One skilled in the art will appreciate that there are numerous devices (not shown) that may be configured to provide the content information to the on-site content information manager 100 via connection 144. Thus, such well-known devices are not described in detail herein other than to the extent necessary to understand the functioning of such devices when coupled to the on-site content information manager 100. Furthermore, such devices may be included as components within the on-site content information manager 100. Any such devices when employed with, or as part of, the on-site content information manager such that new content information is provided to the content information region 116 is intended to be included within the scope of this disclosure and to be protected by the accompanying claims.

Figure 4:
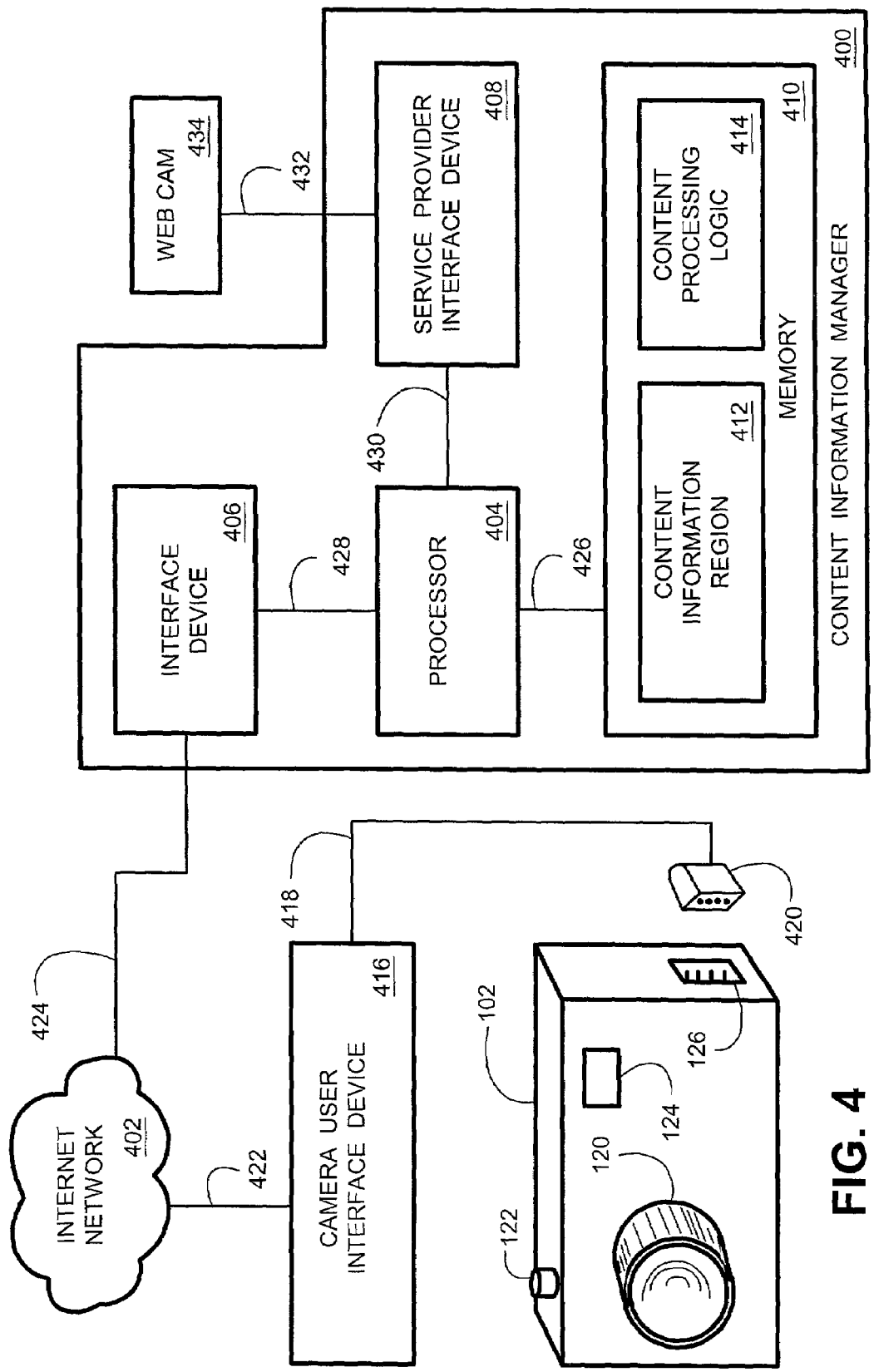
FIG. 4 is a block diagram illustrating an alternative embodiment of a content information manager according to the present invention.

FIG. 4 is a block diagram illustrating an alternative embodiment of an Internet site content information manager 400 according to the present invention in communication with a digital camera 102 via the Internet network 402. The content information manager 400 includes a processor 404, an interface device 406, a service provider interface device 408 and a memory 410. Memory 410 includes portions of the memory structure dedicated for storing data corresponding to the content information residing in the content information region 412 and the content processing logic 414. In one embodiment, the content information manager 400 is located such that the administrator or service provider of content information manager 400 conveniently provides desired content information to the content information manager 400.

The user of digital camera 102 initiates the process of downloading content information into digital camera 102 by coupling camera 102 to the camera user interface device 416. The interface device 416 is coupled to the Internet network 402 via connection 422. For convenience of illustration and for convenience of explaining the operation and functionality of this alternative embodiment, digital camera 102 is illustrated as being coupled to the camera user Internet interface device 416 via connection 418. Connection 418 includes a suitable plug-in attachment 420 configured to mate with the plug-in interface 126. The camera user interface device 416 and connections 422 and 418 enable devices, such as digital camera 102, to become coupled to the Internet network 402. A non-limiting example of one such camera user interface device 416 includes, but is not limited to, a conventional personal computer (PC). In some embodiments of a digital camera 102, the camera user interface device 416 may be included within the digital camera 102 such that the user of the digital camera 102 may more easily access the Internet network 402. In another embodiment, digital camera 102 communicates with the camera user interface 416 with optical, infrared or radio frequency (RF) signals.

Similarly, content information manager 400 includes the interface device 406 such that content information manager 400 is coupled to the Internet network 402, via connection 424. When content information is to be downloaded from the content information region 412 of memory 410 into the received data region 216 (FIG. 2) of digital camera 102, the content information is first retrieved by the Internet site processor 404, via connection 426. The content information is provided to the Internet interface device 406, via connection 428. The interface device 406 may optionally further configure the content information into a suitable format for transmission over the Internet network 402. The interface device 406 transmits the suitably formatted content information, via connection 424, through the Internet network 402 for delivery to the camera user Internet interface device 416. The content information, reconfigured into a suitable format, if necessary, is then downloaded to digital camera 102 for storage in the received data region 216 of memory 212 (FIG. 2).

Internet interface device 406 may be implemented using any of the conventional Internet interface devices that are configured to communicate data onto an Internet network 402. Any such Internet interface device may be implemented in an Internet site content information manager without departing from the functionality and operation of the present invention.

Furthermore, for convenience of illustration in FIG. 4, the interface device 406 is shown residing in the content information manager 400. Internet interface device 406 may also reside in alternative convenient locations outside of the content information manager 400, as components of other systems, or as a stand alone dedicated interface device 406 without adversely affecting the operation and functionality of content information manager 400.

Alternative embodiments of the content information manager 400, and/or the camera user Internet interface device 416 are configured to communicate content information over different types of communication systems or networks. For example, the content information could be communicated over the public switched telephone network (PSTN), a frame relay-based communication system, a wireless communication system, or any other communication system in which the content information manager 400 and/or the camera user interface device 416 has been configured to operate. Furthermore, the content information may also be communicated over combination communication systems or networks without departing from the operation and functionality of the present invention.

Similar to the on-site content information manager 100 (FIG. 1) preferably having a service provider interface device 108 (FIG. 1), the Internet site content information manager 400 preferably includes a service provider interface device 408. The service provider interface device 408 is coupled to the processor 404 via connection 430. The service provider interface device 408 may be adapted to communicate with any variety of devices providing information over connection 432 to the service provider interface device 408, as described above with respect to the service provider interface device 106.

Additionally, the content information manager 400 is particularly advantageous in applications where the content information residing in the content information region 412 is continually updated in an on-going process. For example, but not limited to, a web site camera (web cam) 434 is illustrated as coupling to the content information manager 400 via connection 432. The web cam 434 is conveniently located at a site of interest to the user of digital camera 102. The web cam 434 provides video and/or audio signals in a suitable format to the content information manager 400. The images and/or audio information is stored in the content information region 412 in any desirable and suitable manner. For example, but not limited to, a continuous video stream of information may be saved, or alternatively, selected periodic still images or video segments could be saved. Thus, when the user of digital camera 102 accesses the content information manager 400 through the Internet network 402, the content information residing in the content information region 412 is provided to the digital camera 102 in any manner described hereinabove. Furthermore, the information arriving from the web cam 434 may be directly provided to digital camera 102 on a real-time basis.

One exemplary illustrative example of an embodiment of the content information manager 400 coupled to a web cam 434 includes the situation where the user of camera 102 desires to periodically view events occurring at a child care center where the child of the user of digital camera 102 is. Web cam 434, and other web cams (not shown), are located in desirable positions such that the activities of the children are recorded. At certain times during the day, the user of digital camera 102 may desire to view images recorded by the web cam 434. The user simply couples digital camera 102 to the content information manager 400, via the Internet network 402, and access stored content information residing in the content information region 412 of memory 410 and/or view real-time images recorded by web cam 434.

One skilled in the art will appreciate that the possible applications of the content information manager 400 configured to provide content information (images, audio information and/or meta-data) to a digital camera 102 are endless. Thus, the above-described application of the content information manager 400 is intended to be merely illustrative of the many possible applications for the content information manager 400.

Figure 5:
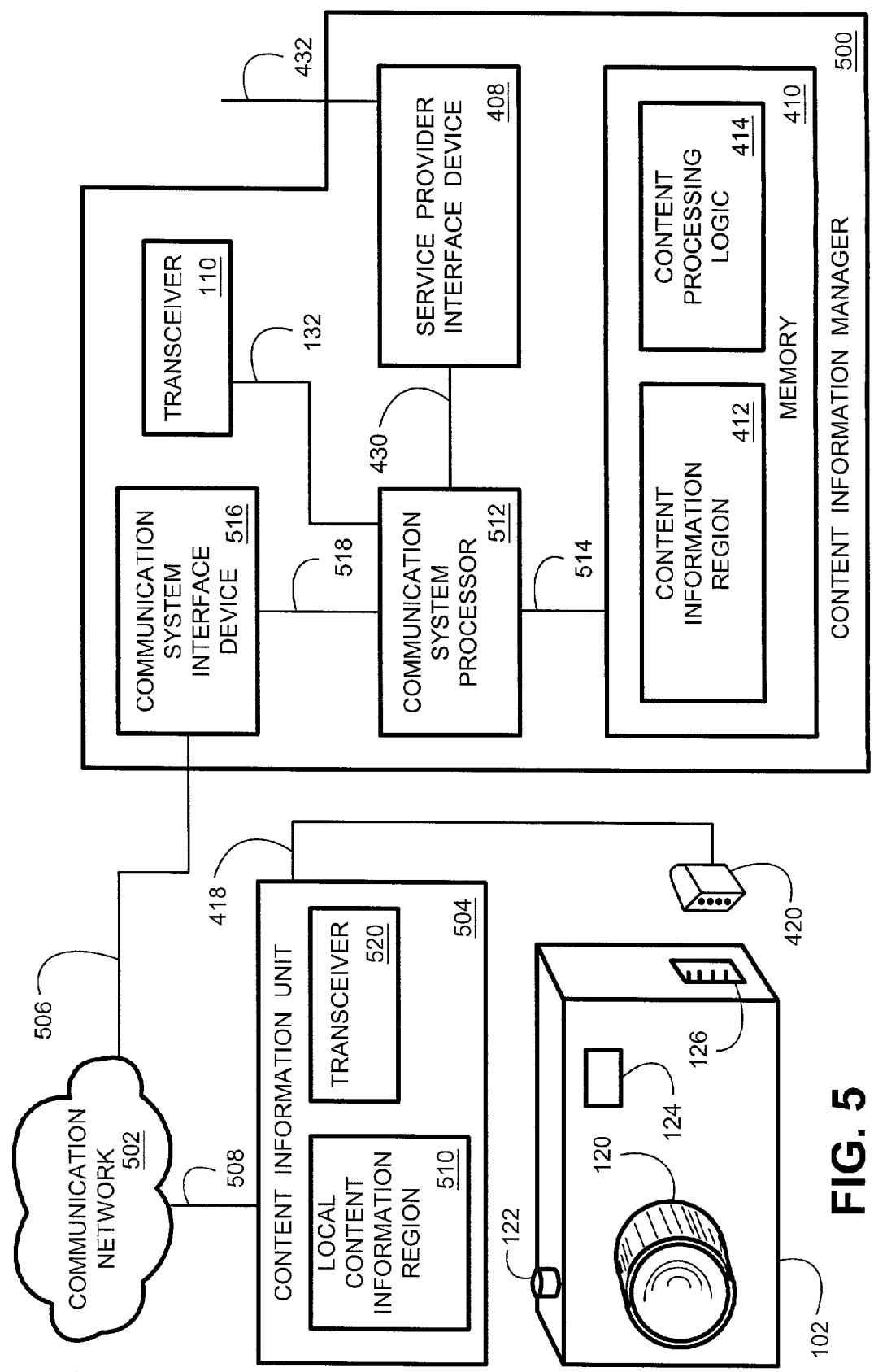
FIG. 5 is a block diagram illustrating another alternative embodiment of a content information manager.

FIG. 5 is a block diagram illustrating an alternative embodiment of a remote content information manager 500, according to the present invention, in communication over a communication network 502 with a content information unit 504, via connections 506 and 508. This embodiment employs at least one content information unit 504 located at convenient locations. Such locations correspond to the above-described locations for the on-site content information manager 100 (FIG. 1). However, this alternative embodiment selectively provides related content information to each of the local content information regions 510 residing in the content information unit 504. Such an alternative embodiment is particularly advantageous in applications where many low cost content information units 504 are employed. A centralized remote content information manager 500 is conveniently located such that the administration or service provider selectively provides content information to each one of the content information local units 504. The administrator or service provider prompts the communication system processor 512 to retrieve content information, via connection 514, from the content information region 412 residing in memory 410 in a manner described above. The retrieved content information is communicated to the communication system interface device 516, via connection 518, and further processed as necessary for transmission onto the communication network 502.

One embodiment of the content information unit 504 includes transceiver 520 for communicating content information to the digital camera 102, and/or connection 418 and plug-in attachment 420, described above. Thus, the content information local unit 504 provides content information in any of the manners described above that are used by the on-site content information manager 100 (FIG. 1) and/or the content information manager 400 (FIG. 4). Other embodiments of the content information unit 504 communicate with digital cameras with optical or infrared signals. Like the on-site content information manager 100 and/or the content information manager 400 (FIG. 4), a content information unit 504 may include a camera interface device, a content processor, a memory and/or content processing logic. The functioning of such components not illustrated residing in the content information local unit 504 are not described herein for convenience because one skilled in the art will readily appreciate the similarity of such components to the components already described above residing in the on-site content information manager 100.

Such an alternative embodiment employing a remote content information manager 500, and a plurality of content information units 504, is particularly desirable in applications where the content information local units 504 are spread over a very large geographic region. For example, a plurality of content information units 504 might be used in an application for providing related consumer information and marketing information at car dealerships. A content information unit 504 is deployed in selected dealerships across the large geographic region. Here, the administrator or service provider updates content information describing new automobile models and/or new automobile features in an efficient, convenient and cost effective manner. Potential purchasers of the automobiles could then conveniently access the content information via their digital cameras 102. Alternatively, a specially-fabricated device having a viewing screen and substantially interfacing in a manner described above for the digital camera 102 with the content information unit 504 could be employed.

Another illustrative example of an application for a remote content information manager 500 communicating with a plurality of content information units 504, is an application having a plurality of content information units 504 dispersed throughout a museum such that content information related to nearby museum exhibits are provided to the users of the digital camera 102. Thus, the administrator or service provider conveniently, efficiently and cost effectively updates the content information related to the associated museum display or other displays or upcoming displays in the museum. Furthermore, such an embodiment is particularly suited for communicating over communication network 502 that is a private branch exchange (PBX) network or the like.

In yet another embodiment, a transceiver 110, as described above, is included within the remote content information manager 500 such that the transceiver 110 residing in the remote content information manager 500 provides updated content information to the individual content information units 504 via wireless communications with the transceivers 504.

What is claimed is:

1. A method for communicating content information from a content information manager to a digital image capture device, the method comprising the steps of:
   receiving a proximity signal from the digital image capture device that indicates the proximity of the digital image capture device to the content information manager, the proximity signal exhibiting a predefined signal strength such that the digital image capture device is in proximity to the content information manager when the proximity signal is detected by the content information manager, the proximity signal being automatically transmitted from the digital image capture device without user initiation of a separate request for content information from the content information manager other than transmission of the proximity signal; and
   automatically transferring the content information to the digital image capture device in response to receiving the proximity signal.

2. The method of claim 1, wherein the step of receiving the proximity signal further comprises receiving a radio frequency proximity signal generated by the digital image capture device.

3. The method of claim 1, wherein the step of receiving the proximity signal further comprises receiving an optical proximity signal generated by the digital image capture device.

4. The method of claim 1, wherein the step of receiving the proximity signal further comprises receiving an infrared proximity signal generated by the digital image capture device.

5. The method of claim 1, wherein the step of receiving the proximity signal further comprises receiving a sound proximity signal generated by the digital image capture device.

6. The method of claim 1, wherein the step of receiving the proximity signal further comprises receiving a manually generated proximity signal generated by a manual actuation device coupled to the content information manager.

7. A digital image capture device configured to receive content information from a content information manager, comprising:
   means for transmitting a proximity signal of predefined signal strength, the proximity signal being automatically transmitted from the digital image capture device without user initiation of a separate request for content information;
   means for receiving the content information from the content information manager; and
   means for displaying the content information on a display residing on the digital image capture device.

8. The device of claim 7, further comprising means for generating a radio frequency (RF) proximity signal having a predefined signal strength such that the digital image capture device is in proximity to the content information manager when the RF proximity signal is detected by the content information manager.

9. The device of claim 7, further comprising means for generating an optical proximity signal such that the digital image capture device is in proximity to the content information manager when the optical proximity signal is detected by the content information manager.

10. The device of claim 7, further comprising means for generating an infrared proximity signal such that the digital image capture device is in proximity to the content information manager when the infrared proximity signal is detected by the content information manager.

11. The device of claim 7, further comprising means for generating a sound proximity signal such that the digital image capture device is in proximity to the content information manager when the sound proximity signal is detected by the content information manager.

12. The device of claim 7, further comprising:
   means for coupling a wire connection to the content information manager, the wire connection coupled to the digital image capture device;
   means for generating a request signal onto the wire connection; and
   means for receiving the content information over the wire connection from the content information manager.

13. The system of claim 7, further comprising means for deleting the received content information after a predetermined time delay.

14. The system of claim 7, further comprising means for deleting the received content information when the digital image capture device is moved away from the content information manager.

15. A system for communicating content information to a digital image capture device, comprising:
   a digital image capture device operative to transmit a proximity signal exhibiting a predefined signal strength, the proximity signal being automatically transmitted from the digital image capture device without user initiation of a separate request for content information; and a content information manager having a memory, a transceiver and an interface device;

the memory configured to store the content information;

the transceiver configured to communicate the content information to the digital image capture device; and the interface device configured to receive the proximity signal when the digital image capture device is in proximity to the content information manager, such that the content information is automatically communicated to the digital image capture device when the proximity signal is received.

16. The system of claim 15, further comprising a camera interface configured to communicate the content information on a wire connection, the wire connection coupled to the digital image capture device.

17. The system of claim 16, further comprising a processor configured to format the content information to at least one data format used by the digital image capture device.

18. The system of claim 15, wherein the content information comprises at least one selected from a group consisting of a digital still image, a digital video image, a meta-data segment and an audio information segment.

19. The system of claim 15, further comprising a proximity detector configured to receive the proximity signal from the digital image capture device such that the content information is communicated to the digital image capture device when the proximity signal is received.

20. The system of claim 19, wherein the proximity signal comprises at least one selected from a group consisting of a radio frequency signal, an optical signal, an infrared signal and a sound signal.

21. A method of communicating content information to a digital image capture device, comprising;

automatically and continuously communicating a proximity signal from the digital image capture device to a content information manager such that, when the digital image capture device comes within a predefined distance of the content information manager, the content information manager determines that the image capture device is available for receiving content information;

automatically communicating the content information from the content information manager to the digital image capture device upon receiving the proximity signal; and displaying the content information on a display residing on the digital image capture device.

22. The method of claim 21, further comprising automatically deleting the received content information after a predetermined time delay.

23. The method of claim 21, further comprising automatically deleting the received content information when the digital image capture device is moved away from the content information manager.

24. A digital image capture device comprising:

a display operative to display images;

a transceiver operative to continuously transmit a proximity signal of predetermined signal strength such that, responsive to receipt of the proximity signal by a content information manager, the content information manager provides the digital image capture device with content, the transceiver being further operative to receive the content information such that the display displays the content information.

25. The digital image capture device of claim 24, further comprising:

a memory operative to store the content information and to delete the content information automatically responsive to the digital image capture device no longer being in proximity of the content information manager from which the content information was provided.

* * * * *